United States Patent
She et al.

(10) Patent No.: US 11,889,140 B2
(45) Date of Patent: Jan. 30, 2024

(54) GLOBAL CONSTRAINT-BASED CONTENT DELIVERY NETWORK (CDN) SELECTION IN A VIDEO STREAMING SYSTEM

(71) Applicant: Hulu, LLC, Santa Monica, CA (US)

(72) Inventors: Qiang She, Beijing (CN); Lan Xie, Beijing (CN); Tongyu Dai, Beijing (CN); Yuting Gui, Beijing (CN); Wenhao Zhang, Beijing (CN); Deliang Fu, Beijing (CN); Chao Li, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/937,965

(22) Filed: Oct. 4, 2022

(65) Prior Publication Data
US 2023/0041976 A1    Feb. 9, 2023

Related U.S. Application Data

(63) Continuation of application No. 17/142,982, filed on Jan. 6, 2021, now Pat. No. 11,496,786.

(51) Int. Cl.
*H04N 21/2665* (2011.01)
*H04N 21/239* (2011.01)
*H04N 21/647* (2011.01)

(52) U.S. Cl.
CPC ..... *H04N 21/2665* (2013.01); *H04N 21/2393* (2013.01); *H04N 21/64738* (2013.01)

(58) Field of Classification Search
CPC ........... H04N 21/2665; H04N 21/2393; H04N 21/64738; H04L 65/80
See application file for complete search history.

(56) References Cited

U.S. PATENT DOCUMENTS

| | | | |
|---|---|---|---|
| 5,646,676 A | 7/1997 | Dewkett et al. |
| 5,684,963 A | 11/1997 | Clement |
| 6,205,477 B1 | 3/2001 | Johnson et al. |
| 6,591,383 B1 | 7/2003 | Michel et al. |
| 7,742,485 B2 | 6/2010 | Zhang |

(Continued)

FOREIGN PATENT DOCUMENTS

| | | | |
|---|---|---|---|
| CN | 103546477 A | 1/2014 |
| CN | 103368940 B | 4/2017 |

(Continued)

OTHER PUBLICATIONS

U.S. Appl. No. 17/937,965, filed Oct. 4, 2022, Qiang She.
(Continued)

*Primary Examiner* — Anthony Bantamoi
(74) *Attorney, Agent, or Firm* — Kwan & Olynick LLP

(57) ABSTRACT

In some embodiments, a method receives a request for a video and receives a ranking of content delivery networks for the request. Also, global constraints are received for the content delivery networks. The global constraints define an allocation for respective content delivery networks. The method selects a content delivery network using the global constraints and the ranking. A score for the content delivery network is altered from a first score to a second score in the ranking and used in the selecting of the content delivery network. The content delivery network that is selected for the request is outputted.

20 Claims, 8 Drawing Sheets

(56) References Cited

U.S. PATENT DOCUMENTS

| | | |
|---|---|---|
| 7,895,445 B1 | 2/2011 | Albanese et al. |
| 8,117,306 B1 | 2/2012 | Baumback et al. |
| 8,169,916 B1 | 5/2012 | Pai et al. |
| 8,276,180 B1 | 9/2012 | Slavenburg et al. |
| 8,370,208 B1 | 2/2013 | Gupta et al. |
| 8,438,393 B2 | 5/2013 | Zhang |
| 8,707,375 B2 | 4/2014 | Hainline |
| 8,843,972 B2 | 9/2014 | Calisa et al. |
| 9,078,020 B2 | 7/2015 | Buehl et al. |
| 9,204,103 B1 | 12/2015 | Zhang et al. |
| 9,712,850 B2 | 7/2017 | Buehl et al. |
| 10,194,210 B2 | 1/2019 | Coudurier et al. |
| 11,082,741 B2 | 8/2021 | Xie et al. |
| 11,496,786 B2 | 11/2022 | She et al. |
| 2002/0059573 A1 | 5/2002 | Nishio et al. |
| 2004/0226045 A1 | 11/2004 | Nadarajah |
| 2005/0033858 A1 | 2/2005 | Swildens et al. |
| 2006/0168632 A1 | 7/2006 | Honda et al. |
| 2008/0215718 A1 | 9/2008 | Stolorz et al. |
| 2008/0306999 A1 | 12/2008 | Finger et al. |
| 2009/0125393 A1 | 5/2009 | Hwang et al. |
| 2009/0168752 A1 | 7/2009 | Segel |
| 2009/0259611 A1 | 10/2009 | Wang et al. |
| 2010/0036954 A1 | 2/2010 | Sakata et al. |
| 2010/0070603 A1 | 3/2010 | Moss et al. |
| 2010/0202509 A1 | 8/2010 | Thompson et al. |
| 2010/0228819 A1 | 9/2010 | Wei |
| 2011/0019627 A1 | 1/2011 | Krishnaswamy et al. |
| 2011/0078327 A1 | 3/2011 | Li et al. |
| 2011/0196894 A1 | 8/2011 | Farber et al. |
| 2012/0079524 A1 | 3/2012 | Kalidindi et al. |
| 2012/0089843 A1 | 4/2012 | Kato et al. |
| 2012/0297410 A1 | 11/2012 | Lohmar et al. |
| 2013/0013377 A1 | 1/2013 | Kruglick |
| 2013/0013688 A1 | 1/2013 | Wang et al. |
| 2013/0268577 A1 | 10/2013 | Oyman |
| 2014/0089998 A1 | 3/2014 | Buehl et al. |
| 2014/0108671 A1 | 4/2014 | Watson et al. |
| 2014/0149794 A1 | 5/2014 | Shetty et al. |
| 2014/0164584 A1 | 6/2014 | Joe et al. |
| 2014/0181285 A1 | 6/2014 | Stevens et al. |
| 2014/0365613 A1 | 12/2014 | Phillips et al. |
| 2015/0012593 A1 | 1/2015 | Phillips et al. |
| 2015/0264413 A1 | 9/2015 | Buehl et al. |
| 2015/0382057 A1 | 12/2015 | Huang et al. |
| 2016/0234069 A1 | 8/2016 | Coudurier et al. |
| 2016/0337426 A1 | 11/2016 | Shribman et al. |
| 2017/0188059 A1 | 6/2017 | Major |
| 2017/0188072 A1 | 6/2017 | Major |
| 2017/0257287 A1 | 9/2017 | Kim et al. |
| 2018/0084306 A1 | 3/2018 | Hunter |
| 2018/0167486 A1 | 6/2018 | Pacella et al. |
| 2018/0219932 A1 | 8/2018 | Natarajan et al. |
| 2018/0241796 A1 | 8/2018 | Srinivasan et al. |
| 2018/0373580 A1 | 12/2018 | Ertl et al. |
| 2018/0376197 A1 | 12/2018 | Gonzalez |
| 2021/0152882 A1 | 5/2021 | Xie et al. |
| 2022/0217432 A1 | 7/2022 | She et al. |

FOREIGN PATENT DOCUMENTS

| | | | |
|---|---|---|---|
| CN | 103825837 B | 6/2017 | |
| CN | 107251569 A | 10/2017 | |
| CN | 107251569 B | 3/2020 | |
| EP | 3257233 A1 | 12/2017 | |
| EP | 3257233 A4 | 8/2018 | |
| EP | 3742706 * | 11/2020 | ........... H04N 21/647 |
| EP | 3742706 A1 | 11/2020 | |
| EP | 4027616 A1 | 7/2022 | |
| KR | 20100054661 A | 5/2010 | |
| WO | 2014062581 A2 | 4/2014 | |
| WO | 2022034619 A1 | 2/2022 | |
| WO | 2022107669 A1 | 5/2022 | |

OTHER PUBLICATIONS

Dai et al., "Content Delivery Network (CDN) Selection Using Performance Metric," filed Aug. 24, 2022, U.S. Appl. No. 17/822,053, 45 pages.

Gangakhedkar et al., "System and Method for Delivering Media Content to Users," filed Feb. 13, 2023, U.S. Appl. No. 18/041,535, 54 pages.

Howe et al., "Intelligent Content Delivery Network (CDN) Entity Routing," filed Jun. 27, 2022, U.S. Appl. No. 17/809,246, 42 pages.

International Search Report & Written Opinion dated Nov. 26, 2021, serial No. PCT/IN21/50781, 9 pages.

U.S. Appl. No. 17/142,982, filed Jan. 6, 2021, Qiang She.

U.S. Appl. No. 17/809,246, filed Jun. 27, 2022, Thomas Howe.

U.S. Appl. No. 17/822,053, filed Aug. 24, 2022, Tongyu Dai.

Chinese Application Serial No. 201680009559.8, Office Action dated Jun. 26, 2019, 21 pgs.

European Application No. 22150150.5, Search Report dated May 27, 2022, 9 pgs.

European Application Serial No. 16749817.9, Office Action dated May 6, 2019, 9 pgs.

Extended European Search Report & Opinion for EP Application 16749817.9, dated Jul. 20, 2018, 9 pages.

International Search Report & Written Opinion for PCT Application PCT/US2016/017380 dated Jun. 8, 2016, 16 pages.

PID Controller, Wikipedia, Retrieved from the Internet on Jun. 27, 2022: https://en.wikipedia.org/wiki/PID_controller.

European Office Action, dated Jun. 13, 2023, Application No. 22150150.5, 2 pages.

European Search Report, Application No. 23184904.3, dated Oct. 25, 2023, 10 pages.

* cited by examiner

US 11,889,140 B2

GLOBAL CONSTRAINT-BASED CONTENT DELIVERY NETWORK (CDN) SELECTION IN A VIDEO STREAMING SYSTEM

CROSS REFERENCE TO RELATED APPLICATIONS

This application is a continuation application and, pursuant to 35 U.S.C. § 120, is entitled to and claims the benefit of earlier filed application U.S. application Ser. No. 17/142,982 filed Jan. 6, 2021, the content of which is incorporated herein by reference in its entirety for all purposes.

BACKGROUND

A video delivery system may use multiple content delivery networks (CDNs) to deliver videos to client devices. When a client device requests a video, a service may select one of the content delivery networks to process the request during a playback session. Upon selecting a content delivery network, the client device communicates with that content delivery network to stream the video.

Different content delivery networks may provide different quality of service (QoS) to different client devices. Accordingly, the content delivery network that is assigned to a client device may impact the playback experience during the playback session. For example, a first content delivery network may offer a first quality of service and a second content delivery network may offer a second quality of service to the client device to play back the video. When the first quality of service and the second quality of service playback experiences are different, the video delivery system may want to assign the content delivery network that offers a higher quality of service experience to the playback session for the video.

Before the playback session starts, the service may rank the different content delivery networks from the perspective of a quality of service metric. The service may then select the content delivery network with the highest ranked quality of service metric. When there are a large number of concurrent plays on a limited number of content delivery network resources (e.g., servers), the load on servers of a content delivery network may be heavily influenced when large amounts of requests are assigned to a single content delivery network that is ranked the highest. In some cases, the video delivery system is determining the ranking of content delivery networks in real time as requests are received. The process may also be stateless and independent of other decisions to rank content delivery networks. That is, the video delivery system has not considered the state of other decisions that are being made to select content delivery networks in the current decision. Accordingly, a single content delivery network that is ranked with a higher priority may be selected to service a large number of requests due to the stateless nature of the process. Accordingly, that content delivery network may experience a lower quality of service when having to process the requests even though the content delivery network is ranked the highest.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may receive a request for playback of a video. Then, the video delivery system may rank content delivery networks based on a metric. Conventionally, the video delivery system may have selected the highest ranked content delivery network. However, the video delivery system may apply a constraint to the ranking before the selection. For example, the constraint may be global constraints that specify an allocation for specific content delivery networks to be selected for processing requests. The global constraints may be global in that the video delivery system uses the global constraints across multiple requests. Also, the global constraints may specify an allocation in different formats, such as a content delivery network #1 should be selected 66% of the time and a content delivery network #2 should be selected 34% of the time. The global constraints may alter the ranking for the content delivery networks. For example, the global constraints may alter a score for a content delivery network. Then, the video delivery system selects a content delivery network from the altered ranking of content delivery networks.

By applying the global constraints to the ranking of content delivery networks, the video delivery system can enforce a global allocation on the selection of content delivery networks. The altered ranking of content delivery networks may not exactly follow the global constraints, but the global constraints are influenced by the characteristics of the current playback session to generate the altered ranking of the content delivery networks. Using the global constraints may avoid the situation where a single content delivery network is selected to process a large number of requests concurrently or within a short period of time. By applying the global constraints, a large number of concurrent requests may have their requests allocated across the content delivery networks according to the global constraints. The global constraints may be used across multiple requests, which allows the video delivery service to apply the constraints while the selection process is stateless. By allocating the processing of requests across content delivery networks according to the global constraints, the overall quality of service of the content delivery networks may be maintained more optimally.

System Overview

Figure 1:
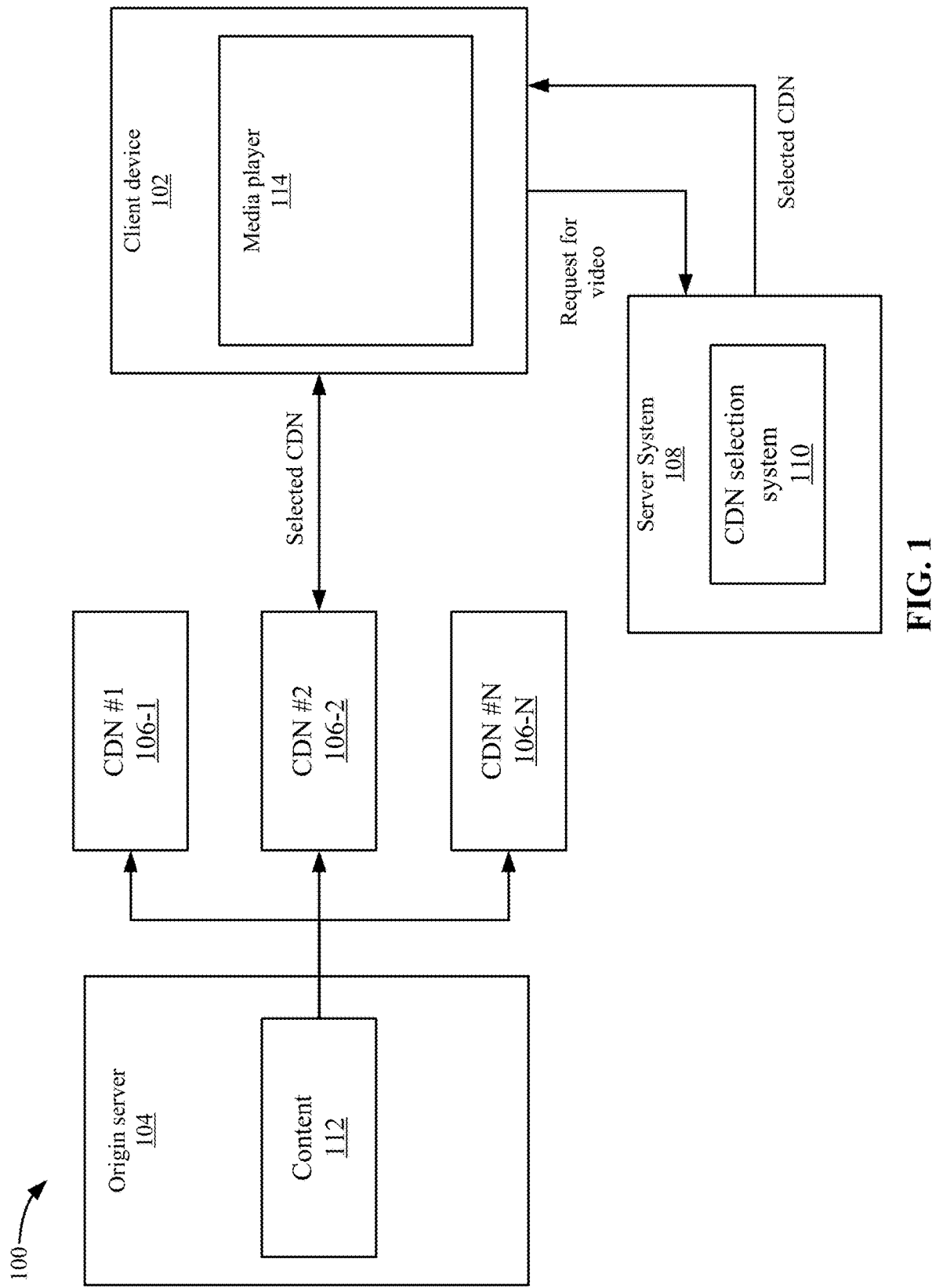
FIG. 1 depicts a simplified system for selecting a content delivery network according to some embodiments.

FIG. 1 depicts a simplified system 100 for selecting a content delivery network 106 according to some embodiments. System 100 includes a client device 102, an origin server 104, content delivery networks (CDNs) #1 to #N 106-1 to 106-N.

Origin server 104 may store representations of content in storage 112. The representations may include different playback characteristics for the content, such as different representations of a video at different bitrates and/or quality (e.g., resolutions). Origin server 104 may provide the representations of content to different content delivery networks #1 to #N. Client device 102 can request the content from each content delivery network 106 and each content delivery network 106 may independently be able to respond with the content. For example, each content delivery network 106 may include one or more servers that can send the content to client device 102.

Client device 102 may include a computing device, such as a smartphone, set top box, tablet device, living room device, gaming console, etc. Client device 102 includes a media player 114 that can play the content. Client device 102 may use one of the content delivery networks, such as a content delivery network #2, to begin playing the content with media player 114. Client device 102 may experience different playback conditions for each content delivery network 106. For example, the playback conditions may differ based on the network being used by each content delivery network 106 and the servers being used. This results in the content being delivered at different available bandwidths to client device 102.

A server system 108 may process a request for a video from client device 102. Although not shown, server system 108 may be processing requests from multiple client devices 102, both sequentially and concurrently. For example, client devices 102 may be using a video delivery service to request a large number of videos concurrently or within a time period. The time period may be a limited time period, such as a time taken to receive the request and start playback of a video.

Server system 108 is configured to select one of content delivery networks 106 to process the requests. A content delivery network (CDN) selection system 110 may select the content delivery network for the request and provide the selected content delivery network 106 to client device 102 and/or the selected content delivery network 106. Client device 102 may then interact with the selected content delivery network 106, such as content delivery network #2 106-2. Content delivery network #2 106-2 may then send the video, such as segments of the video, to client device 102, which displays the segments of video on media player 114.

As mentioned above, CDN selection system 110 may select a content delivery network 106 to process the request based on a selection process. The following will describe a selection process that may select a content delivery network 106 by applying global constraints to the selection.

CDN Selection System

Figure 2:
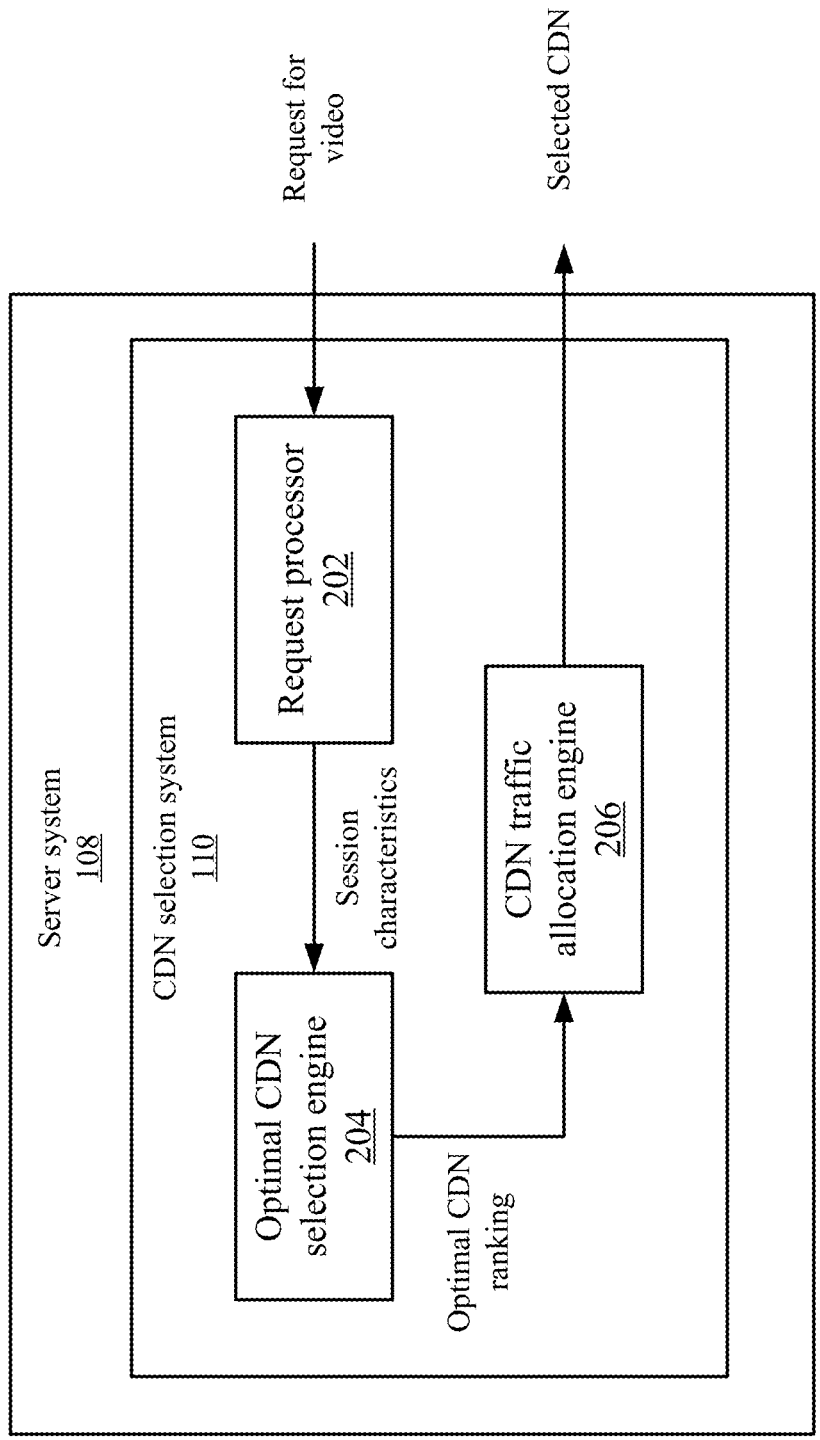
FIG. 2 depicts a more detailed example of a CDN selection system according to some embodiments.

FIG. 2 depicts a more detailed example of CDN selection system 110 according to some embodiments. Request processor 202 receives a request for a video from client device 102. Request processor 202 may retrieve session characteristics for the request. For example, request processor 202 may extract information for the request, such as a user account identifier, information about client device 102 (e.g., client device type, etc.), or other information. Also, request processor 202 may retrieve information related to the request. For example, request processor 202 may determine a user account identifier associated with the request, and then retrieve features from the user account, such as a device type the user account is using.

After retrieving information for the request, CDN selection system 110 performs the ranking process. Although two engines are described, it will be recognized that the functions performed by both engines may be combined or distributed to other engines. For example, the calculations that are described may be performed in a single calculation.

An optimal CDN selection engine 204 receives the session characteristics and can rank content delivery networks 106 in an optimal CDN ranking. For example, optimal CDN selection engine 204 may generate the optimal CDN ranking based on a metric, such as a performance metric. In some embodiments, a quality of service metric may be used, which may be related to the bandwidth provided during a playback session for a content delivery network 106. However, other metrics may be used, such as failure ratios when segments fail to be downloaded, re-buffer ratios where client devices 102 experience re-buffering, etc. It is noted that one or more metrics may be used in the analysis.

The optimal CDN ranking may generate a ranking for respective content delivery networks 106. In some embodiments, the ranking may use scores that rank content delivery networks 106. A score may rate a respective content delivery network 106 within a range of values. In other examples, the optimal CDN ranking may rank content delivery networks 106 in an order without using scores. The optimal CDN ranking may be stateless in that other decisions for other requests being concurrently processed are not considered.

A CDN traffic allocation engine 206 may apply a global constraints to the optimal CDN ranking when selecting the content delivery network. The global constraints may be applied during the ranking process described above to generate a ranking in a single calculation. The global constraints may be information that is used to constrain the selection of content delivery networks on a global basis. The global basis may be across multiple requests where the global constraints are applied. For example, the global constraints may specify an allocation (e.g., a proportion, percentage, etc.) of requests that should be processed by content delivery networks 106. The allocation may be determined based on how many requests content delivery networks 106 should process over time to offer the optimal quality of service to client devices 102. For example, the video delivery system may desire that selections of content delivery networks 106 follow allocations in the global constraints over time based on historical data of how content delivery networks 106 performed in processing requests.

While the selection in real time of a content delivery network may not exactly equal the global constraints, CDN traffic allocation engine 206 uses the characteristics of the current playback session to generate a ranking of content delivery networks 106 that may be similar to the global constraints depending on the deviation of the characteristics from historical data. The global constraints may be based on historical data that is used to generate an allocation for content delivery networks 106 to process requests. When content delivery networks 106 are operating similarly to the historical data used to generate the global constraints, then CDN selection system 110 may select content delivery networks 106 in allocations close to the global constraints. However, when fluctuations occur in the optimal CDN ranking, some deviation in the allocations from the global constraints may occur. Once the global constraints are applied to the optimal CDN ranking, CDN traffic allocation engine 206 can select a content delivery network 106 from the altered optimal CDN ranking.

Using the global constraints allows CDN traffic allocation engine 206 to apply a desired allocation to the content delivery network selection. Even though a content delivery network may be selected for each request in a stateless manner, using the global constraints may apply a global restriction on the selection. Accordingly, CDN traffic allocation engine 206 may distribute the selection of content delivery networks 106 for multiple requests across the available content delivery networks 106 without overloading a content delivery network 106 that may be ranked higher in most of the requests. If the global constraints are used to guide the content delivery network selection, it is expected the quality of service that can be offered by content delivery networks 106 during normal operation will be optimal.

Figure 3:
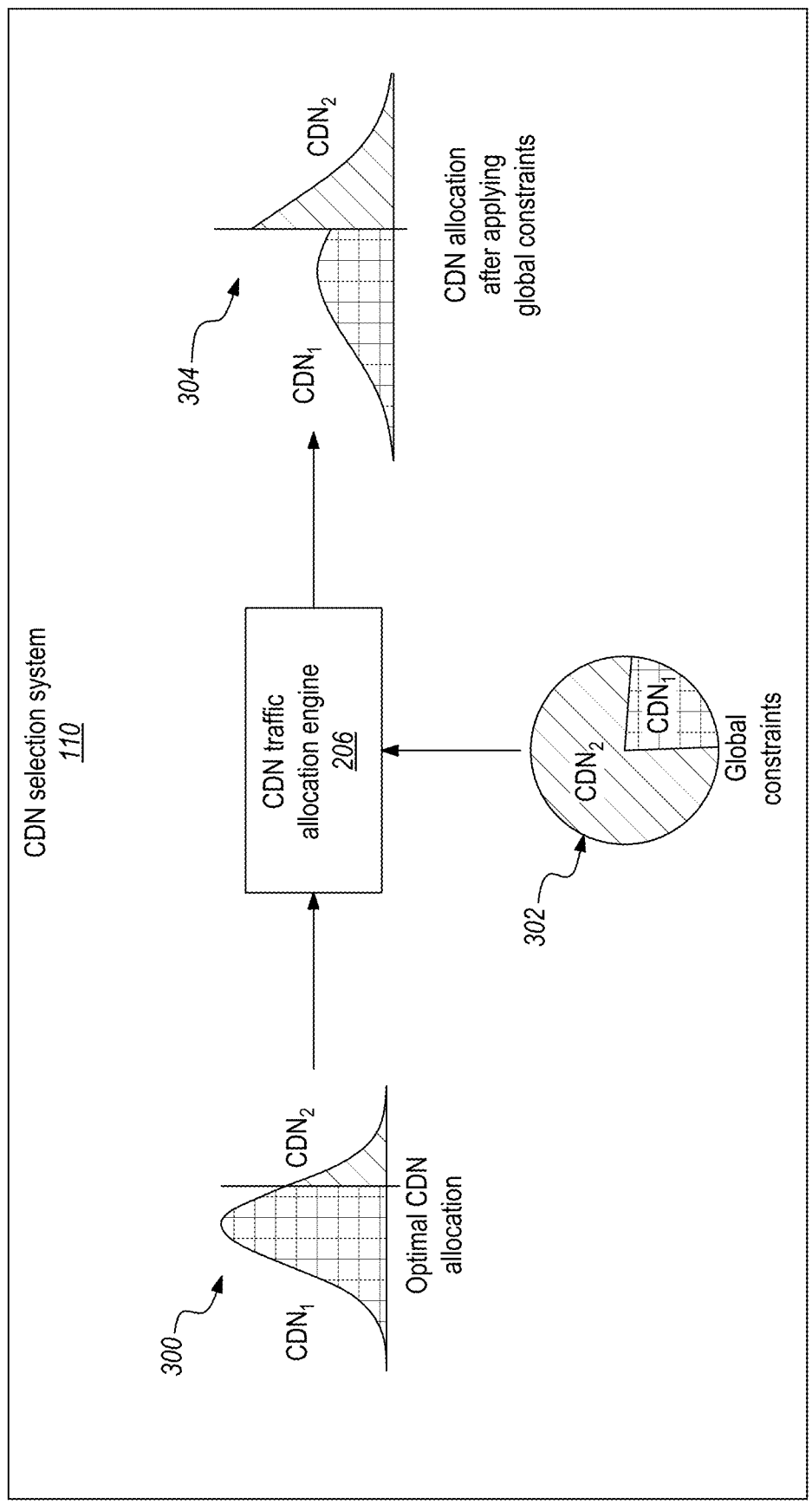
FIG. 3 shows an example of applying the global constraints to an optimal CDN ranking according to some embodiments.

FIG. 3 shows an example of applying the global constraints to an optimal CDN ranking according to some embodiments. It is noted that the optimal CDN allocation and global constraints are shown for visual purposes and may be represented in different formats. At 300, an optimal CDN allocation shows a distribution of which content delivery network 106 is selected from the optimal CDN ranking. For example, a content delivery network #1 ($CDN_1$) and a content delivery network #2 ($CDN_2$) are shown in the distribution. The area under the curve may be a representation of a number of times a respective content delivery network is selected from the optimal CDN ranking. The representation may be a probability of selecting the respective content delivery network from the optimal CDN ranking. That is, to be selected, content delivery network #1 may be ranked #1 or content delivery network #2 may be ranked #1 in the optimal CDN ranking. In the optimal CDN allocation at 300, CDN #1 is selected more than content delivery network #2, such as the allocation is content delivery network #1 is selected approximately ⅔ of the time and content delivery network #2 is selected approximately ⅓ of the time.

CDN traffic allocation engine 206 receives global constraints that are shown at 302. The global constraints may be a desired allocation for content delivery network #1 and content delivery network #2. The allocation is shown as a pie chart, but other representations may be used. Content delivery network #1 may be associated with a first percentage of around ⅓ percent and content delivery network #2 may be associated with a second percentage that is around ⅔ percent. The pie chart shows the percentages visually by the area of the circle. Accordingly, the global constraints indicate content delivery network #2 may be allocated a larger number of requests compared to content delivery network #1 because content delivery network #2 is allocated more area in the circle.

After applying the global constraints to the optimal CDN allocation, the ranking of content delivery networks 106 that are output by CDN traffic allocation engine 206 are altered based on the globally constrained CDN allocation at 304. As can be seen, the percentage that content delivery network #1 is selected is less than the allocation shown in the optimal CDN allocation at 300 as the amount of area under the curve for content delivery network #1 has been reduced lower in the globally constrained CDN allocation at 304. Also, the allocation for content delivery network #2 has been increased because the amount of area in the CDN allocation at 304 has increased compared to the amount of area under the curve for content delivery network #2 in the optimal CDN allocation at 300. The optimal CDN allocation and global constraints are thus combined to form the globally constrained CDN allocation. Different optimal CDN allocations that are calculated may result in different globally constrained CDN allocations when the same global constraints are applied. However, the globally constrained CDN allocation for many requests may be substantially equal to the global constraints over time while allowing for some fluctuation.

Figure 4:
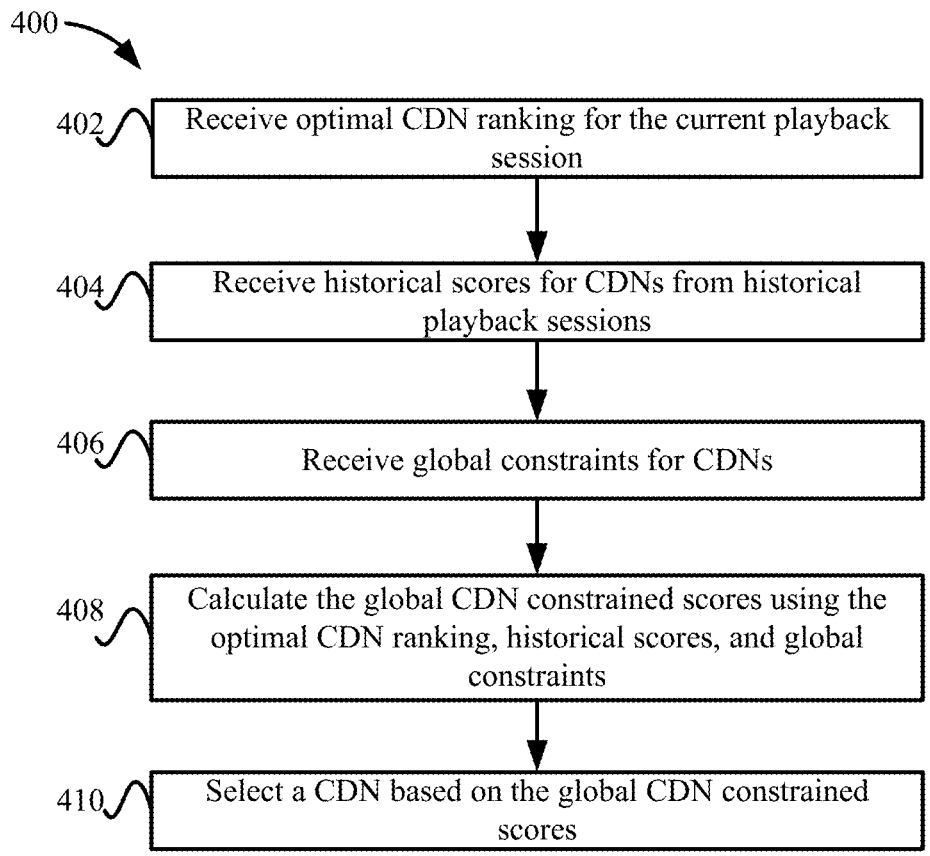
FIG. 4 depicts a simplified flowchart of a method for applying global constraints according to some embodiments.

FIG. 4 depicts a simplified flowchart 400 of a method for applying global constraints according to some embodiments. At 402, CDN traffic allocation engine 206 receives an optimal CDN ranking for the current playback session. As discussed above, the optimal CDN ranking may include scores that rank content delivery networks 106 based on characteristics for the current playback session.

At 404, CDN traffic allocation engine 206 receives historical scores for content delivery networks 106 from historical playback sessions. The historical scores may be scores from content delivery networks 106 that were selected to service the historical playback sessions. The number of historical playback sessions may be based on a setting, such as the previous ten sessions. Also, the historical playback sessions may be associated with the client device 102 that sent the request or may be associated with other client devices 102. The historical scores may be used to remove bias in the optimal CDN ranking. For example, the historical scores may adjust the optimal CDN ranking by scaling the scores for the optimal CDN ranking to be closer to a distribution of the historical scores. Since historical scores may have been adjusted using the global constraints, the use of the historical scores to remove bias may adjust the optimal CDN ranking to be closer to the global constraints.

At 406, CDN traffic allocation engine 206 receives the global constraints for content delivery networks 106. As mentioned above, the global constraints may represent a desired allocation of content delivery networks 106 that are selected to process requests for videos.

At 408, CDN traffic allocation engine 206 calculates the globally constrained CDN scores using the optimal CDN ranking, historical scores, and global constraints. The globally constrained CDN scores used to generate an altered optimal CDN ranking that is based on the global constraints and historical scores. The calculation of the globally constrained CDN scores will be discussed in more detail below. The globally constrained CDN scores may not exactly follow the global constraints, but the fluctuations in the scores of the optimal CDN rankings may alter the values for the global constraints.

At 410, CDN traffic allocation engine 206 selects a content delivery network 106 based on the globally constrained CDN scores. The selected content delivery network 106 may be the highest-ranked content delivery network 106 in the global CDN constrained scores. However, other methods may be used to select content delivery network 106. For example, a weighted random selection may be performed based on the global CDN constrained scores. The selected content delivery network 106 is then output to client device 102 and/or the selected content delivery network 106 where client device 102 and the selected content delivery network 106 communicate to stream the video.

Globally Constrained CDN Score Calculation

The following describes a process of calculating the globally constrained CDN scores according to some embodiments. There may be different methods that are used to calculate the globally constrained scores, however. Assuming there are m number of CDN resources, labeled by $CDN_1$, $CDN_2$, ..., $CDN_m$ respectively, and they form a finite aggregate S. The inputs to CDN traffic allocation engine 206 include two parts. The first input is all the content delivery networks $\widehat{c}_i$, with the corresponding scores $\widehat{a}_i$, for the current playback session calculated by optimal CDN selection engine 204. The label $\widehat{c}_i$ may mean the i-th content delivery network 106 in the finite aggregate S, and may correspond to the label $CDN_i$. The label $\widehat{a}_i$, may mean the score of the i-th content delivery network 106, and optimal CDN selection engine 204 generates this score. The score values may or may not be sorted in order, but for ease of description, content delivery networks 106 are sorted by the score values (either descending or ascending):

$$U=\{(\widehat{C_1},\widehat{a_1}), (\widehat{C_2},\widehat{a_2}), \ldots, (\widehat{C_m},\widehat{a_m})\},$$

where $\widehat{c}_i \in S$ $\widehat{a}_i \in R_{\geq 0}$, and the list $\{\widehat{a_1}, \widehat{a_2}, \ldots, \widehat{a_m}\}$ is sorted. The finite list U may be a set of content delivery network resources and their corresponding scores $\widehat{a}_i$ that are generated from the optimal CDN selection engine 204 for the current playback session. For example, the finite list U contains $CDN_1$, $CDN_2$, ..., $CDN_m$ and their corresponding scores $\widehat{a_1}, \widehat{a_2}, \ldots, \widehat{a_m}$. The statement $\widehat{c}_i \in S$ means, for any content delivery network 106 listed in the finite list U, the content delivery network 106 should also belong to the finite aggregate S. For example, in the finite list U, all the content delivery networks 106, including $\widehat{a}_1, \ldots, \widehat{a}_i$ all belong to the finite aggregate S. The statement $\widehat{a}_i \in R_{\geq 0}$ means, for any content delivery network scores $\widehat{a}_i$ listed in the finite list U, it should be a non-negative real number.

The second input is from historical playback sessions that have been previously processed by CDN traffic allocation engine 206. For those sessions, the inputs are labeled in a set T:

T={$(C_1, a_1)$, $(C_2, a_2)$, ..., $(C_i, a_i)$, ... } where $C_i \in S$, $a_i \in R_{\geq 0}$ The global constraints may be defined as a CDN traffic proportion, which means the output of CDN traffic allocation engine 206 follows a known discrete probability distribution P, $$p_i = p(CDN_i),\ i = 1, 2, \ldots, m,$$

where $\sum_{i=1}^{m} p_i = 1, 0 \leq p_i \leq 1$.

The above allocates a probability distribution to content delivery networks 106 as the global constraints.

In some embodiments, CDN traffic allocation engine 206 calculates an optimal discrete probability distribution Q, where the probability of reselecting the i-th CDN is $q_i$=q($CDN_i|U,T$), the range of the distribution probability is the finite set S. The optimization objective is to minimize the gap between the probability distribution among outputs of the function and the given constraints, and also maximize probability of aligning inputs and outputs of the function:

$$\min \sum_{i=1}^{m} |q(CDN_i|U, T) - p_i|^2$$

$$\max \sum_{i=1}^{m} P(CDN_i = \widehat{c_i})$$

The first function minimizes the gap between the probability distribution among outputs of the function and the given global constraints. The second function maximizes probability of aligning the inputs and outputs of the function. The input may mean the optimal content delivery network 106 (e.g., the content delivery network 106 with the highest CDN score) generated from optimal CDN selection engine 204. In the max formula above, the content delivery network 106 $\widehat{c_1}$ is the input. According to the definition of the finite list U above, content delivery network 106 $\widehat{c_1}$ is the optimal content delivery network 106 after sorting the CDN scores that are generated by optimal CDN selection engine 204. The output may mean the selected content delivery network 106 based on the calculated optimal discrete probability distribution Q. In the max-formula above, the content delivery network $CDN_i$ is the output. The max formula means a goal of the CDN traffic allocation engine 206 is to maximize the possibility of letting the output ($CDN_i$) be equal to be input ($\widehat{c_1}$). In this way, CDN traffic allocation engine 206 at best can respect the ranking result of the optimal selection engine 204.

CDN traffic allocation engine 206 may use different processes to generate the globally constrained CDN scores. It may be hard to calculate an accurate analytical solution of the optimal function, especially considering given historical data set T is often finite and time-varying. The uncertainty of the values in historical data set T makes it hard to accurately calculate the optimal content delivery network 106. Considering the historical data set T, it can be finite and endless. Because the mathematical distribution of historical CDN scores $a_i$ is variable and uncertain, it may be hard to accurately describe the information (such as probability expectations, variances, etc.) from the historical data in the real-time manner. Also, the mathematical distribution of historical CDN scores $a_i$ may change over time, which makes the description and accurate calculation harder. But in the real-time scenario definition, calculating the accurate solution may be hard, CDN traffic allocation engine 206 uses the above approximate solution to select the optimal content delivery network 106 based on the global constraints. Accordingly, CDN traffic allocation engine 206 may use the approximate solution so that the defined problem can be solved and calculated in real-time. A proposed calculation can be described in the following steps.

CDN traffic allocation engine 206 groups elements in the given historical input set T by different content delivery networks 106 so the set T is divided into m subsets. Each subset corresponds to a specific content delivery network 106 and the elements in the set are quality of service scores associated with the specified CDN in the original set T:

$$T = V_1 \cup V_2 \cup \ldots \cup V_m$$

where $V_i = \{a_{k_1,i}, a_{k_2,i}, a_{k_3,i}, \ldots \}, \forall C_{k_j,i} = CDN_i$.

The set T may be the original historical CDN scores divided into multiple subsets $V_1, V_2, \ldots, V_i, \ldots V_m$. The i-th subset $V_i$ contains all the historical CDN scores that correspond to the i-th content delivery network $CDN_i$. The variable $V_i$ represents a set of historical scores of the i-th CDN, which may be originally from the historical data set T. The score $a_{k_1,i}$ may mean the first CDN score in the historical sessions with specified i-th content delivery network, the score $a_{k_2,i}$ may mean the second historical CDN score, and the score $a_{k_j,i}$ may mean the j-th historical CDN score, and so on. The variable $C_{k_j,i}$ may mean the content delivery network 106 corresponding to the historical CDN score $a_{k_j,i}$. The equation $\forall C_{k_j,i} = CDN_i$ may mean, for any j-th historical CDN score $a_{k_j,i}$, the corresponding content delivery network $C_{k_j,i}$ should always be the i-th content delivery network.

CDN traffic allocation engine 206 may normalize the input data set U, such as by applying a specified function $\hat{b}_i = f(\hat{a}_i, U)$ to normalize all the given CDN scores. The normalization function may include:

$$\Sigma \hat{b}_i = 1, 0 \leq \hat{b}_i \leq 1,$$

where variable $\hat{b}_i$ may mean the results of normalizing the original variable $\hat{a}_i$ (e.g., the score of i-th content delivery network 106 generated by optimal CDN selection engine 204). For example, assuming here $U = \{(\widehat{C_1} = CDN_1, \widehat{a_1} = 0.7), (\widehat{C_2} = CDN_2, \widehat{a_2} = 0.2)\}$, and the function $f(\hat{a}_i, U) = \hat{a}_i / \widehat{a_1} + \widehat{a_2}$, then:

$$\widehat{b_1} = \widehat{a_1} / \widehat{a_1} + \widehat{a_2} = 0.7/(0.7+0.2) = 0.778$$

$$\widehat{b_2} = \widehat{a_2} / \widehat{a_1} + \widehat{a_2} = 0.2/(0.7+0.2) = 0.222.$$

The function $\Sigma \hat{b}_i = 1, 0 \leq \widehat{a_i} \leq 1$ may mean that the sum of the normalized values $\widehat{b_1}, \widehat{b_2}, \ldots, \widehat{b_i}, \ldots, \widehat{b_m}$ should equal 1, and for any i-th normalized value $\hat{b}_i$, the value may be between the range of 0 to 1. The function defines that the normalized values $\widehat{b_1}, \widehat{b_2}, \ldots, \widehat{b_i}, \ldots, \widehat{b_m}$ should form a mathematical discrete probability distribution. Although the above normalization function is described, other functions may be used that may meet the limitation $\Sigma \hat{b}_i = 1, 0 \leq \hat{b}_i \leq 1$. After the normalization, the input set of U is: $U = \{(\widehat{C_1}, \widehat{b_1}), (\widehat{C_2}, \widehat{b_2}), \ldots, (\widehat{C_m}, \widehat{b_m})\}$, which means the CDN scores have been normalized by the function b.

$\hat{C}_i, \hat{b}_i$ For each pair ( ) in the input set U, CDN traffic allocation engine 206 selects a subset of V where the subset contains all the scores corresponding to the content delivery network $\hat{C}_i$. Assuming the subset is $V_j$, considering both $\hat{b}_i$ and all the CDN scores in the subset are generated by a determined (but probably unknown) probability distribution, CDN traffic allocation engine 206 applies another specified function $\hat{a}_i = g(\hat{b}_i, V_j)$ to transform the CDN score $\hat{b}_i$, making sure the calculated value has certain mathematical expectation $\mu_i$ and standard deviation $\sigma_i$. The expectation (which may be called the expected value) is measuring the arithmetic mean of random variables generated from a math probability distribution. The standard deviation is a measure of the amount of variation or dispersion of a set of random variables generated from a certain math probability distribution. The normalized value $\hat{b}_i$ and also the historical CDN scores in the subset $V_j$ are random variables and assuming they are all generated from a certain (but maybe unknown) probability distribution, the expectation $\mu_i$, and standard deviation $\sigma_i$ are calculated using the $\hat{b}_i$ normalized value and the subset $V_j$, and are describing the pattern of the specified probability distribution. CDN traffic allocation engine 206 may use different expressions of the function g.

CDN traffic allocation engine 206 constructs a discrete probability distribution using a specified function h as the final approximately optimal solution, $$\hat{a}_Q = h(D, \widetilde{a_m}), \text{ where } D = \{ , \ldots, \},$$

with the generated value and the given global constraints P. The above applies the global constraints to the optimal CDN scores. In some embodiments, the function h may take different forms, but it may meet the following requirement:

$$\lim_{\hat{b}_i \to \mu_i} h(D, P) = p(CDN_i) = p_i.$$

The above limits the probability of a content delivery network 106 to the probability p. This equation means, when the normalized content delivery network score is closer to the expectation value $\mu_i$, the result of function h(D, P) should be correspondingly closer to $p_i$ (which is the probability of occurrence of the i-th CDN in the global constraint).

CDN traffic allocation engine 206 updates the historical data set T by inserting all the globally constrained elements in the set $U = \{(\widehat{C_1}, \widehat{b_m}, \widehat{a_m}), (\widehat{C_2}, \widehat{b_2}), \ldots, ( )\}$. CDN traffic allocation engine 206 can calculate the optimal distribution Q in real-time, and CDN traffic allocation engine 206 can rely on the distribution to select a content delivery network 106 for the current playback session. The selection may follow the global constraints with fluctuations based on the scores from the optimal CDN ranking calculated by optimal CDN selection engine 204.

CDN selection system 110 performs the selection in real-time, which may be within a time in which a request for playback of a video is received to a beginning of playback of the video. The beginning of playback may depend on the selection of a content delivery network 106 within a certain acceptable period of time. For different video playback sessions, the original CDN scores $\hat{a}_i$ of the specified i-th content delivery network 106 are independent and identically distributed. With this assumption, CDN selection system 110 can use the statistical average and variance values to approximately estimate the expectation $\mu_i$ and standard deviation $\sigma_i$ values, and those estimations may be used in the function $g( , V_j)$. During the estimation of $\mu_i$ and $\sigma_i$, the statistical average and variance values can be calculated and updated in a real-time way.

In some embodiments, a batch normalization sampling and a normal distribution process may be used; however, other processes may also be used.

Batch Normalization Sampling Process

The following process integrates batch normalization sampling into the content delivery network selection process. Batch normalization normalizes the input of the optimal CDN ranking using the historical data set of previous CDN selections. The results of CDN selection system 110 could have various forms and the corresponding probability distributions may be uncertain, so the batch sampling method may be a more general use case.

Figure 5:
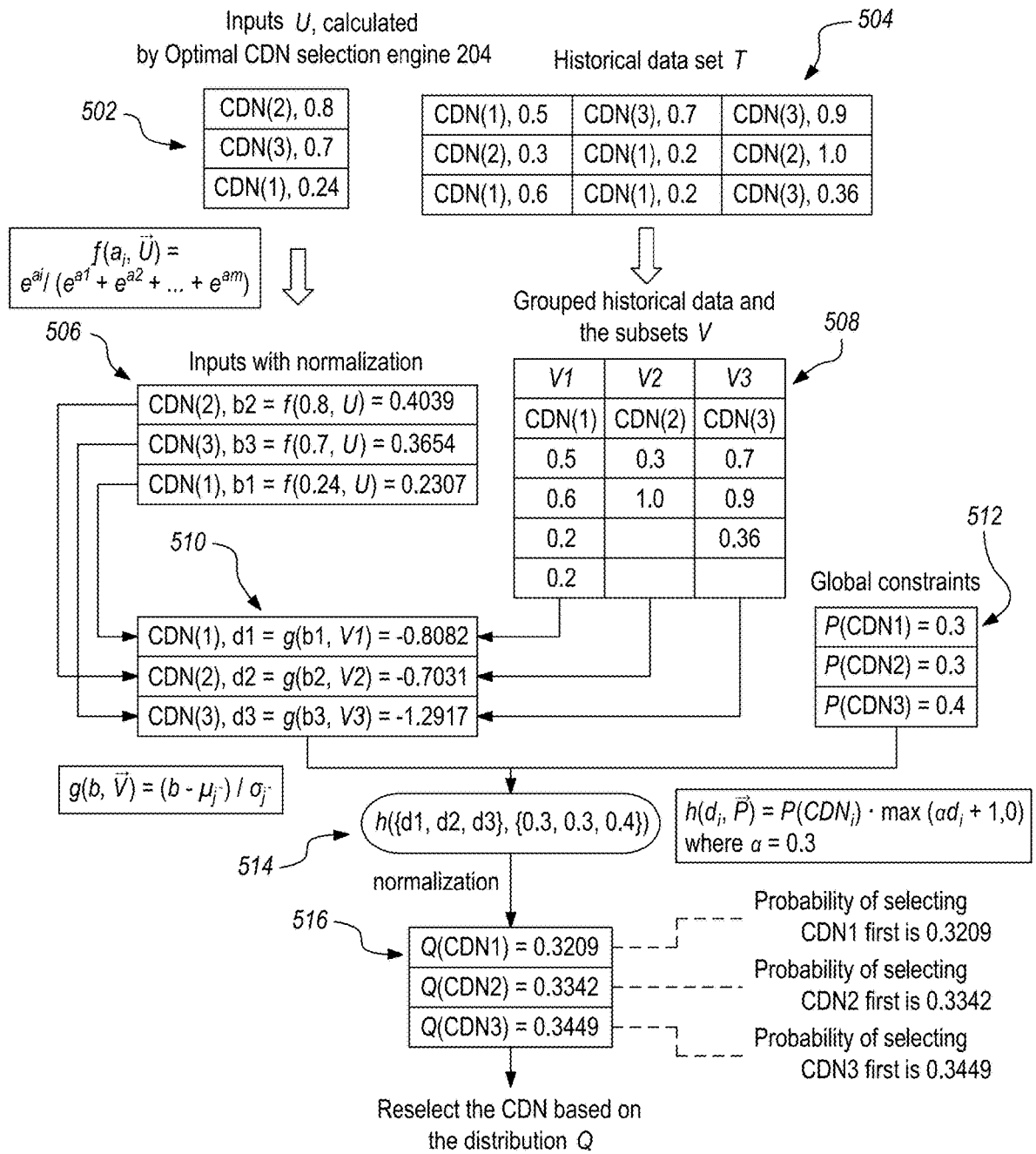
FIG. 5 depicts an example of a batch normalization sampling process according to some embodiments.

FIG. 5 depicts an example of a batch normalization sampling process according to some embodiments. At 502, CDN traffic allocation engine 206 receives an input of the optimal CDN ranking. For example, CDN traffic allocation engine 206 receives scores for a content delivery network #1 (CDN (1)), a content delivery network #2 (CDN (2)), and a content delivery network #3 (CDN (3)). For example, content delivery network #1 includes a score of 0.24; content delivery network #2 includes a score of 0.8; and content delivery network #3 includes a score of 0.7. In this scoring methodology, the scores may be within a range, such as from 0 to 1 and the lower the score, the lower the ranking for the respective content delivery network 106. For example, content delivery network #1 may be the lowest ranked with a score of 0.24, and content delivery network #2 may be the highest ranked with a score of 0.8.

At 504, a historical data set T includes scores for content delivery networks 106 that were selected for historical playback sessions. For example, on the first row, a content delivery network #1 was selected for a first playback session and had a score of 0.5; a content delivery network #3 was selected for a second playback session and had a score of 0.7; content delivery network #3 was selected for a third playback session with a score of 0.9. The other rows show other selections. Each score shown in the historical data set T shows a content delivery network 106 that was selected for the playback session and an associated score. Although only the selected content delivery network 106 and score is used, scores for other content delivery networks 106 may be used, such as the second highest ranked score, the third highest ranked score, and so.

At 506, CDN traffic allocation engine 206 may normalize the inputs. As shown, the respective scores may be adjusted for content delivery networks #1, #2, and #3 to 0.2307, 0.4039, and 0.3654. The normalization may regularize the input scores to remove some bias. In some embodiments, CDN traffic allocation engine 206 may use the following function to normalize the inputs:

$$\hat{b}_i = f(\hat{a}_i, U) = \frac{e^{\hat{a}_i}}{e^{\hat{a}_1} + e^{\hat{a}_2} + \ldots + e^{\hat{a}_m}},$$

where the finite list U may be a set of content delivery network resources and their corresponding scores $\hat{a}_i$ that are generated from the optimal CDN selection engine 204 for the current playback session and e may be Euler's number, which is a mathematical constant approximately equal to 2.71828.

At 508, CDN traffic allocation engine 206 groups the historical data in the subsets V for respective content delivery networks 106. For example, all scores for content delivery network #1 are shown in a subset V1; all scores for content delivery network #2 are shown in a subset V2; and all scores for content delivery network #3 are shown in a subset V3.

At 510, CDN traffic allocation engine 206 applies the historical data to scale the normalized content delivery network scores. The respective scores from the historical data adjust the respective scores for the current playback session to remove some bias for the respective scores in the current playback session. For example, applying the historical data for content delivery network #1 may adjust any bias in determining the score for content delivery network #1 in the current playback session. In some embodiments, CDN traffic allocation engine 206 may use the following function to scale the normalized CDN score:

$$\hat{a}_i = g(\hat{b}_i, V_j) = \frac{\hat{b}_i - \mu'_j}{\sigma'_j}, i = 1, 2, \ldots, m,$$

$\mu'_j$=Average of vector $V_j$ where
$\mu'_j$=Average of vector $V_j$
$\sigma'_j$=Standard deviation of vector $V_j$.

The function may use the average of the scores in the set V and the standard deviation of the scores in the set V to scale the normalized CDN score.

At 512, the global constraints for content delivery networks 106 are shown. For example, content delivery networks #1, #2, and #3 include the global constraints of 0.3, 0.3, and 0.4. The global constraints may represent a probability distribution of scores for the content delivery networks 106.

At 514, CDN traffic allocation engine 206 applies the global constraints to the scores from 510 for the respective content delivery networks 106. CDN traffic allocation engine 206 may use the following function to construct a weighted discrete probability distribution of content delivery networks 106:

$$\hat{a}_i, q_i = h(\,, p_i) = \max(\alpha \cdot + 1, 0) \cdot p_i,$$

where the constant $\alpha$ may be used for compressing the variance of . The $\hat{a}$ function $\max(\alpha \cdot + 1, 0)$ selects the larger of $\hat{a}$ the two values $\alpha \cdot + 1$ and zero. The variable $p_i$ may be the original traffic share of the i-th content delivery network 106 in the global CDN constraints. For example, $p_1$=P(CDN1)=0.3, $p_2$=P(CDN2)=0.3, and $p_3$=P(CDN3)=0.4. The equation $q\hat{a}_i = h(\,, p_i) = \max(\alpha \cdot + 1, 0) \cdot p_i$ ensures that the constructed weighted discrete distribution does not have a negative probability.

In some embodiments, the global constrained scores represent a probability of selecting a respective content delivery network 106 first (e.g., selecting the highest ranked) where the higher the score, the higher the ranking of the respective content delivery network 106. The application of the global constraints results in scores for content delivery networks #1, #2, and #3 of 0.3209, 0.3342, and 0.3449, respectively. When reselecting the optimal content delivery network 106 based on the distribution Q, the probability of occurrence of content delivery network #1 is lower than content delivery network #2, which follows the pattern in the original optimal CDN ranking U that the score of 0.24 for content delivery network #1 is lower than the score of 0.8 for content delivery network #2. But, the randomness of the distribution makes sure that there is also chance that all content delivery networks 106 can be chosen as the optimal one instead of ordering these content delivery networks 106 strictly depending on partial ordering relations in the original optimal CDN ranking U. For example, the globally constrained scores for content delivery network #1 and content delivery network #2 are closer at 0.3209 and 0.3342, respectively, compared to 0.24 and 0.80, respectively.

The globally constrained scores are altered versions of the optimal CDN scores to allow the possibility of selecting all content delivery networks 106 because the distribution of the global constraints may adjust the optimal CDN ranking to change the rankings. As shown, the globally constrained scores do not exactly equal the global constraints. However, when compared to the optimal CDN ranking scores at 502, the global constrained scores may be closer to the global constraints. For example, for content delivery network #1, the global constrained score is 0.3209 and the optimal CDN ranking score is 0.24. The global constrained score of 0.3209 is closer to the global constraints of 0.3. For content delivery network #2, the optimal CDN ranking score is 0.8, the globally constrained score is 0.3342, and the globally constrained score of 0.3342 is closer to the global constraints of 0.3 when compared to optimal CDN ranking of 0.8. Similarly, content delivery network #3 includes a globally constrained score 0.3449 that is closer to the global constraints of 0.4 compared to the optimal CDN ranking score of 0.7. In this case, CDN traffic allocation engine 206 may select content delivery network #3, which has the highest globally constrained score. This may be different from the order of the optimal CDN ranking, which ranked content delivery network #2 as the highest ranked content delivery network.

The batch normalization sampling process allows the constrained CDN scores to fluctuate around the global constraints and the volatilities of the fluctuations depend on the current optimal CDN scores calculated by optimal CDN selection engine 204. The degree at which the globally constrained scores deviate from the average level of historical records may also influence the volatility of the fluctuations.

Normal Distribution Transform Process

A normal distribution transform process may convert the scores of the optimal CDN ranking to a random seed, which is a value that is used in a random generator process. CDN traffic allocation engine 206 applies the random seed to the global constraints to generate the globally constrained CDN scores. Using the random seed may allow the globally constrained scores to fluctuate around the global constraints based on the values of the optimal CDN ranking. The normal distribution transform is specially designed to process a normal distribution, is a type of continuous probability distribution for a real-valued random variable. The normal distribution transform assumes that all raw CDN scores from the optimal CDN selection engine 204 are following a same normal distribution. With such an assumption, the normal distribution transform exploits properties of the normal distribution, and therefore the results of the final optimal CDN ranking should have less bias with the global constraints.

Figure 6:
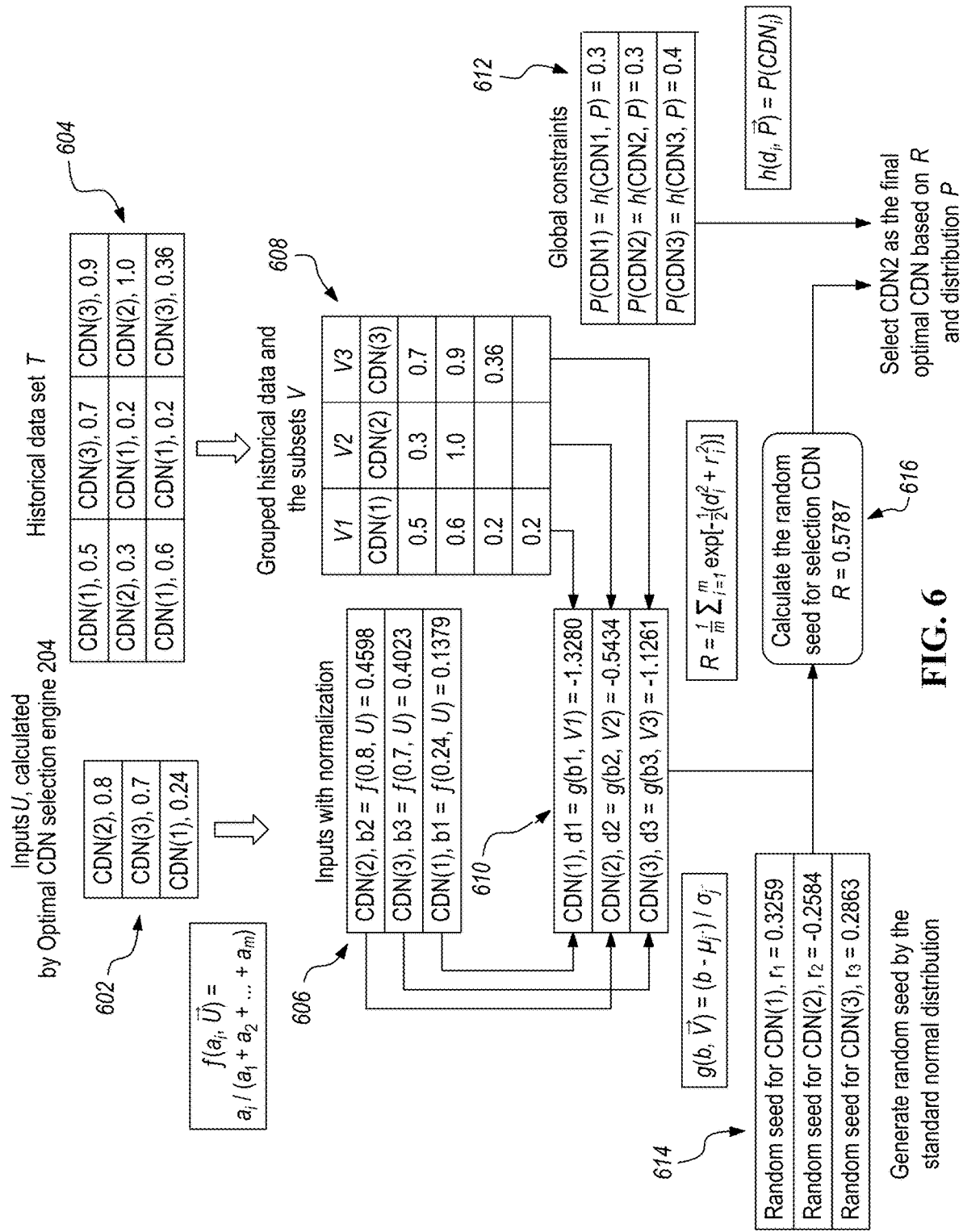
FIG. 6 depicts an example of a normal distribution transform process according to some embodiments.

FIG. 6 depicts an example of a normal distribution transform process according to some embodiments. At 602, CDN traffic allocation engine 206 receives an input of the optimal CDN ranking, which may be similar to as described in FIG. 5. At 604, a historical data set T includes scores for content delivery networks 106 that were selected for historical playback sessions, which may be similar to as described in FIG. 5.

At 606, CDN traffic allocation engine 206 may normalize the inputs, which may be similar to as described in FIG. 5. As shown, the respective scores may be adjusted for content delivery networks #1, #2, and #3 to 0.2307, 0.4039, and 0.3654. The normalization may regularize the input scores to remove some bias. In some embodiments, CDN traffic allocation engine 206 may use the following function to normalize the inputs, but other functions may be used:

$$\hat{b}_i = f(\hat{a}_i, U) = \frac{\hat{a}_i}{\hat{a}_1 + \hat{a}_2 + \ldots + \hat{a}_m}.$$

At 608, CDN traffic allocation engine 206 groups the historical data in the subsets V for respective content delivery networks 106, which may be the same as in FIG. 5. At 610, CDN traffic allocation engine 206 applies the historical data to scale the normalized content delivery network scores, which may be similar to as described in FIG. 5. At 612, the global constraints for content delivery networks 106 are shown.

At 614, CDN traffic allocation engine 206 transforms the normalized CDN scores at 610 into respective random seeds that are generated from a fixed probability distribution (e.g., a standard normal distribution) without using the normalized CDN scores at 610. In order words, the generation process of the random seeds r1, r2, r3 at 614 is independent and may have no relationship with the normalized CDN scores at 610. Each of these values may be called a "random seed" because they are random variables and generated from a fixed probability distribution. The random seed is used because the values are used for calculating a random value R to select a content delivery network 106 at 616. In some examples, the random seed for content delivery network #1 is $r_1=0.3259$, the random seed for content delivery network #2 is $r_2=-0.2584$, and the random seed for content delivery network #3 is $r_3=0.2863$.

At 616, CDN traffic allocation engine 206 calculates a random seed R for selecting the optimal content delivery network 106. A random seed R is equal to 0.5787. CDN traffic allocation engine 206 may calculate the random seed R using the following:

$$R = \frac{1}{m}\sum\nolimits_{k=1}^{m} \exp\left(-\frac{\hat{a}_i^2 + r_i^2}{2}\right),$$

where $r_i$ is a respective random seed generated at 614. The output R may be a random value and can be regarded as a point in the discrete probability distribution P at 612. According to FIG. 6, the random seed is R=0.5787 at 616, and the distribution P at 612 is P(CDN1)=0.3, P(CDN2) =0.3, and P(CDN3)=0.4. To calculate the random seed value, the following values are:
d1=−1.3280, d2=−0.5434, d3=−1.1261
r1=0.3259, r2=−0.5434, r3=0.2863
The random seed R is calculated as:

$$\begin{aligned} R &= \frac{1}{3}\left[\exp\left(-\frac{d1^2 + r1^2}{2}\right) + \exp\left(-\frac{d2^2 + r2^2}{2}\right) + \exp\left(-\frac{d3^2 + r3^2}{2}\right)\right] \\ &= \frac{1}{3} \times \left[\exp\left(-\frac{(-1.3280)^2 + 0.3259^2}{2}\right) + \exp\left(-\frac{(-0.5434)^2 + (-0.5434)^2}{2}\right) + \exp\left(-\frac{(-1.1261)^2 + 0.2863^2}{2}\right)\right] \\ &= \frac{1}{3} \times [0.3926 + 0.8344 + 0.5091] \\ &= 0.5787. \end{aligned}$$

The cumulative probabilities in the distribution P are:

Cumulative probability of CDN1=$P$(CDN1)=0.3

Cumulative probability of CDN2=$P$(CDN1)+$P$(CDN2)=0.6

Cumulative probability of CDN3=$P$(CDN1)+$P$(CDN2)+$P$(CDN3)=1.0

In those cumulative probability values, CDN traffic allocation engine 206 finds the corresponding content delivery network 106 whose cumulative probability is just larger than the random seed R, which is the result of CDN2 (0.6). So, the final optimal CDN $C_{opt}$ may be CDN2.

At 618, CDN traffic allocation engine 206 then selects a content delivery network 106 as the final optimal content delivery network based on the random seed R and the global constraints P. In some embodiments, the index of the final optimal content delivery network $C_{opt}$ in the set S={$CDN_1$, $CDN_2$, ..., $CDN_m$} may be index of the content delivery network 106 whose cumulative probability is just larger than the random seed R. The probabilities of each content delivery network 106 defined in the distribution P is describing an interval of possible values for the calculated random value R at 616. For example, in the distribution P at 612, CDN1 corresponds to an interval 0~0.3, CDN2 corresponds to an interval 0.3~0.6, and CDN3 corresponds to 0.6~1.0. After calculating the random value R at 616, according to the above intervals, CDN traffic allocation engine 206 can select the final optimal content delivery network 106 from the range. The following may be used to select the final optimal content delivery network 106:

$$opt = \operatorname*{argmin}_{i} \sum\nolimits_{k=1}^{i} p_k \geq R,$$

where argmin is the argument of the minimum, and p is the global constraints.

The randomness of the random seed R allows CDN traffic allocation engine 206 to select all content delivery networks 106 while still considering the optimal CDN ranking.

Conclusion

Accordingly, the global constraints can be used to control the selection of content delivery networks 106 by CDN traffic allocation engine 206. The global constraints are influenced by a stateless calculation of an optimal CDN ranking, which allows the characteristics of the current playback session to influence the selection of a content delivery network 106 by allowing fluctuations around the global constraints.

Example Embodiments

In some embodiments, a method comprising: receiving, by a computing device, a first ranking of content delivery networks for a playback session of a video; receiving, by the computing device, global constraints for the content delivery networks, wherein the global constraints define an allocation for respective content delivery networks; altering, by the computing device, a score for a content delivery network in the first ranking to generate a second ranking of content delivery networks; and selecting, by the computing device, a content delivery network from the second ranking for the playback session of the video.

In some embodiments, the method further comprising: receiving a request for the video from a client device, wherein the selected content delivery network services the request.

In some embodiments, the method further comprising: selecting a characteristic of the playback session; and using the characteristic to generate the first ranking.

In some embodiments, the first ranking comprises a score for respective content delivery networks.

In some embodiments, the allocation in the global constraints defines an allocation of requests to assign to respective content delivery networks.

In some embodiments, the global constraints are used across multiple requests for videos over a time period.

In some embodiments, altering the score for the content delivery network comprises: altering each score for the content delivery networks based on the global constraints.

In some embodiments, altering the score for the content delivery network comprises: altering the score for the content delivery network based on a difference from the score in the first ranking to a respective global constraint for the content delivery network.

In some embodiments, altering the score for the content delivery network comprises: generating a random value that is associated with the score for the content delivery network; and using the random value and the score for the content delivery network to select the content delivery network based on the global constraints.

In some embodiments, altering the score for the content delivery network comprises: minimizing a gap between the score for the content delivery network and a respective global constraint for the content delivery network.

In some embodiments, the method further comprising: applying historical data for prior scores for respective content delivery networks to the scores for the first ranking to adjust the scores for the first ranking.

In some embodiments, the prior scores have been altered based on the global constraints.

In some embodiments, each content delivery network in the first ranking is configured to deliver the video independently to a client device.

In some embodiments, the first ranking is based on a performance metric associated with the content delivery networks.

In some embodiments, a non-transitory computer-readable storage medium containing instructions, that when executed, control a computer system to be operable for: receiving a first ranking of content delivery networks for a playback session of a video; receiving global constraints for the content delivery networks, wherein the global constraints define an allocation for respective content delivery networks; altering a score for a content delivery network in the first ranking to generate a second ranking of content delivery networks; and selecting a content delivery network from the second ranking for the playback session of the video.

In some embodiments, the global constraints are used across multiple requests for videos over a time period.

In some embodiments, altering the score for the content delivery network comprises: altering the score for the content delivery network based on a difference from the score in the first ranking to a respective global constraint for the content delivery network.

In some embodiments, altering the score for the content delivery network comprises: generating a random value that is associated with the score for the content delivery network; and using the random value and the score for the content delivery network to select the content delivery network based on the global constraints.

In some embodiments, altering the score for the content delivery network comprises: minimizing a gap between the score for the content delivery network and a respective global constraint for the content delivery network.

In some embodiments, an apparatus comprising: one or more computer processors; and a non-transitory computer-readable storage medium comprising instructions, that when executed, control the one or more computer processors to be operable for: receiving a first ranking of content delivery networks for a playback session of a video; receiving global constraints for the content delivery networks, wherein the global constraints define an allocation for respective content delivery networks; altering a score for a content delivery network in the first ranking to generate a second ranking of content delivery networks; and selecting a content delivery network from the second ranking for the playback session of the video.

System

Figure 7:
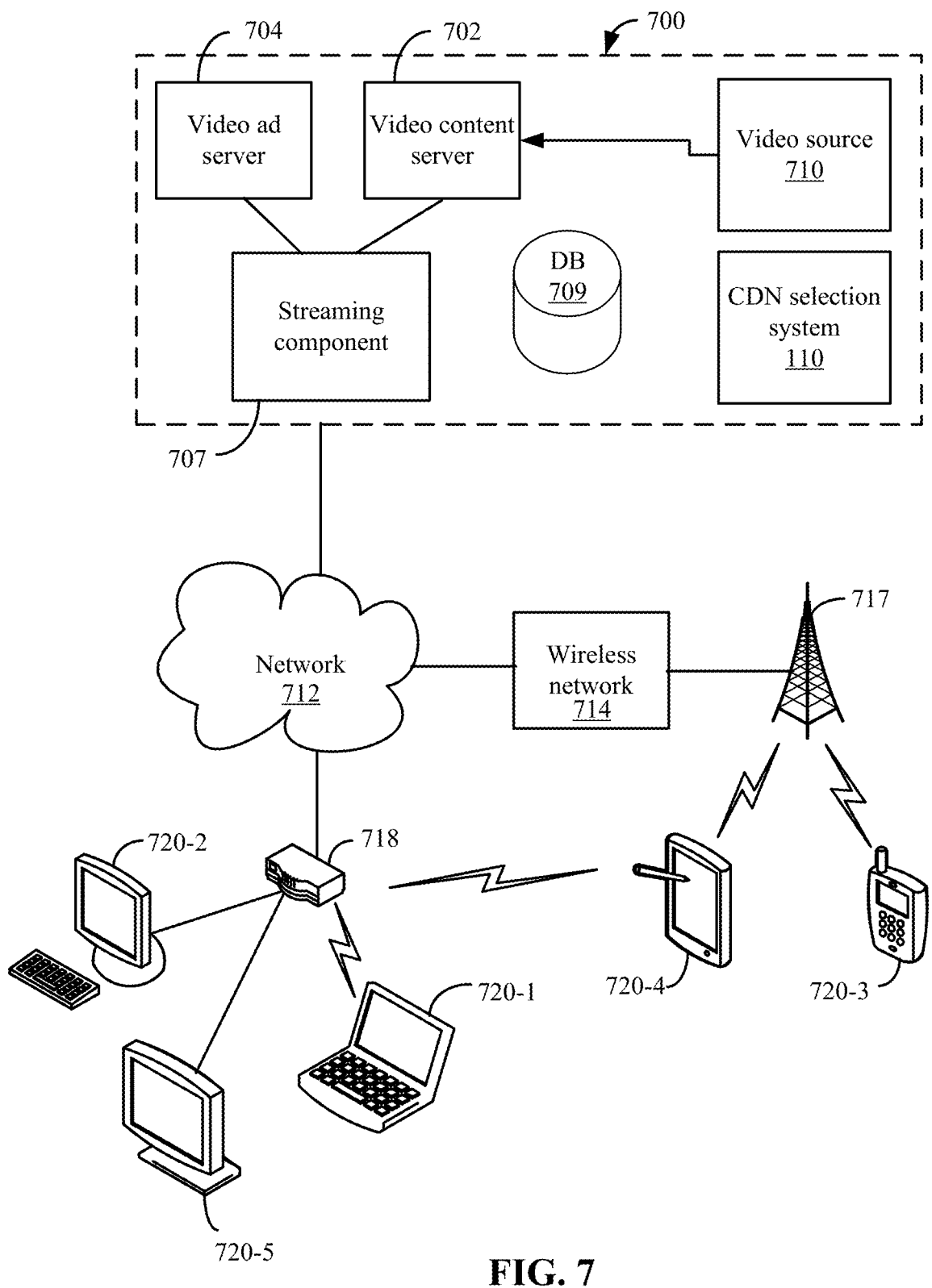
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include CDN selection system 110.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
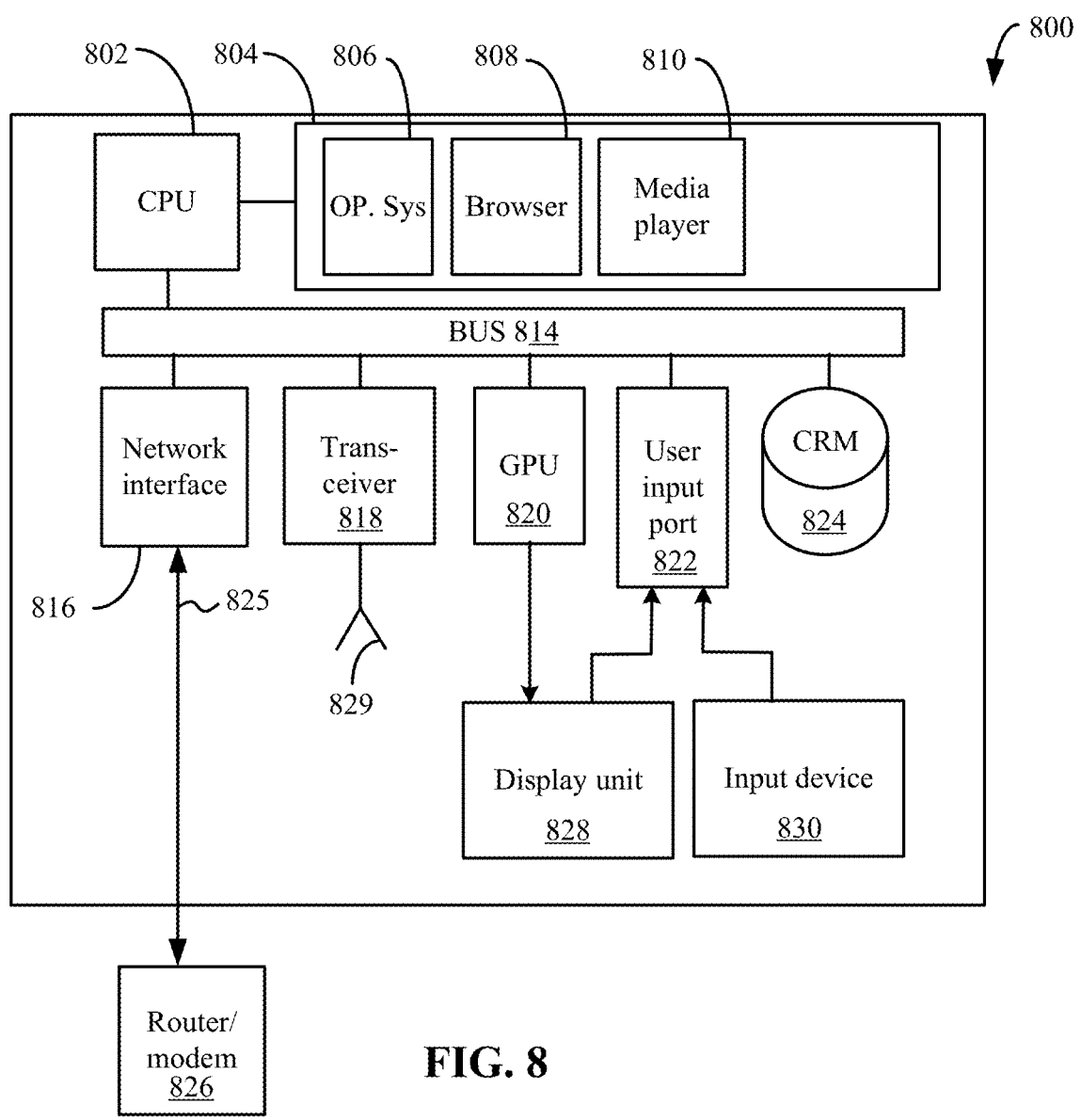
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a request for a video;
   receiving, by the computing device, a ranking of a plurality of content delivery networks for the request;
   receiving, by the computing device, historical scores for respective content delivery networks in the plurality of content delivery networks from rankings in historical playback sessions;
   receiving, by the computing device, global constraints for the plurality of content delivery networks, wherein the global constraints define an allocation for respective content delivery networks;
   selecting, by the computing device, a content delivery network using the global constraints, the ranking, and the historical scores, wherein a first score for the content delivery network is altered to a second score, and the second score is used in the selecting of the content delivery network; and
   outputting, by the computing device, the content delivery network that is selected for the request.

2. The method of claim 1, wherein:
   receiving the request for the video is received from a client device, and
   the content delivery network that is selected services the request.

3. The method of claim 1, further comprising:
   selecting a characteristic of a playback session for the request; and
   wherein the ranking that is received is generated using the characteristic.

4. The method of claim 1, wherein the ranking that is received is associated with the first score for the content delivery network.

5. The method of claim 1, wherein:
   the ranking that is received comprises respective scores for the plurality of content delivery networks, and
   the respective scores are altered in the ranking based on the global constraints.

6. The method of claim 1, wherein the allocation in the global constraints defines an allocation of requests to assign to respective content delivery networks.

7. The method of claim 1, wherein the global constraints are used across multiple requests for videos over a time period.

8. The method of claim 1, further comprising:
   altering a respective first score for each content delivery network to a respective second score based on the global constraints.

9. The method of claim 1, wherein the first score for the content delivery network is altered based on a difference from the first score to a respective global constraint for the content delivery network.

10. The method of claim 1, wherein the first score is altered by applying a weight based on a global constraint to the first score.

11. The method of claim 1, wherein:
    the first score is altered by generating a random value that is associated with the first score for the content delivery network; and
    the random value and the global constraints are used to select the content delivery network.

12. The method of claim 1, wherein the first score is altered by minimizing a gap between the first score for the content delivery network and a respective global constraint for the content delivery network to generate the second score.

13. The method of claim 1, further comprising:
    applying a historical score to an original score for the content delivery network to generate the first score.

14. The method of claim 1, further comprising:
    applying historical scores for respective content delivery networks to the scores for the ranking to adjust the scores for the ranking.

15. The method of claim 1, wherein each content delivery network in the ranking is configured to deliver the video independently to a client device.

16. The method of claim 1, wherein the ranking is based on a performance metric associated with the content delivery networks.

17. The method of claim 1, wherein the second score does not equal a respective global constraint for the content delivery network.

18. A non-transitory computer-readable storage medium containing instructions, that when executed, control a computer system to be operable for:

receiving a request for a video;

receiving a ranking of a plurality of content delivery networks for the request;

receiving historical scores for respective content delivery networks in the plurality of content delivery networks from rankings in historical playback sessions;

receiving global constraints for the plurality of content delivery networks, wherein the global constraints define an allocation for respective content delivery networks;

selecting a content delivery network using the global constraints, the ranking, and the historical scores, wherein a first score for the content delivery network is altered to a second score, and the second score is used in the selecting of the content delivery network; and outputting the content delivery network that is selected for the request.

19. A method comprising:

receiving, by a computing device, a request for a video;

receiving, by the computing device, a ranking of content delivery networks for the request;

receiving, by the computing device, historical scores for respective content delivery networks in a plurality of content delivery networks from rankings in historical playback sessions;

receiving, by the computing device, global constraints for the content delivery networks, wherein the global constraints define an allocation for respective content delivery networks;

altering, by the computing device, a first score for a content delivery network in the ranking to a second score based on at least one of the global constraints and at least one of the historical scores;

selecting, by the computing device, a content delivery network from the ranking, wherein the second score is used in the selecting; and outputting, by the computing device, the content delivery network that is selected for the request.

20. The method of claim 19, wherein the first score is altered by applying a weight based on a global constraint to the first score.

\* \* \* \* \*